United States Patent [19]

Murphy

[11] Patent Number: 5,610,822
[45] Date of Patent: Mar. 11, 1997

[54] POSITION-RELATED MULTI-MEDIA PRESENTATION SYSTEM

[75] Inventor: Michael D. Murphy, Sunnyvale, Calif.

[73] Assignee: Trimble Navigation, Ltd., Sunnyvale, Calif.

[21] Appl. No.: 397,887

[22] Filed: Mar. 3, 1995

[51] Int. Cl.6 .................................................. H04N 7/00
[52] U.S. Cl. ........................ 364/449.5; 364/424.012; 348/8; 340/996
[58] Field of Search .............................. 364/449, 452, 364/444, 460, 424.01; 340/995, 996; 348/8; 342/357, 457; 395/154

[56] References Cited

U.S. PATENT DOCUMENTS

| | | | |
|---|---|---|---|
| 4,521,021 | 6/1985 | Dixon | 273/148 B |
| 4,584,603 | 4/1986 | Harrison | 358/86 |
| 4,756,528 | 7/1988 | Umashankar | 273/1 E |
| 4,866,515 | 9/1989 | Tagawa et al. | 358/86 |
| 4,937,751 | 6/1990 | Nimura et al. | 364/449 |
| 5,208,590 | 5/1993 | Pitts | 340/973 |
| 5,311,302 | 5/1994 | Berry et al. | 348/14 |
| 5,381,338 | 1/1995 | Wysocki et al. | 364/449 |
| 5,424,951 | 6/1995 | Nobe et al. | 364/443 |
| 5,459,824 | 10/1995 | Kashiwazaki | 395/131 |
| 5,507,556 | 4/1996 | Dixon | 297/217.3 |

*Primary Examiner*—Michael Zanelli
*Attorney, Agent, or Firm*—Patrick T. King

[57] ABSTRACT

A position-related multi-media presentation system for a vehicle. A position determining system generates position information of a vehicle. The position information is transferred to a multi-media system. The multi-media system presents information related to the position of the vehicle to an occupant of the vehicle. In one embodiment, video information is displayed on a display unit located on the back of a seat of an aircraft. The video information provides views related to features over which the aircraft is flying.

44 Claims, 5 Drawing Sheets

POSITION-RELATED MULTI-MEDIA PRESENTATION SYSTEM

TECHNICAL FIELD

The present invention relates generally to position determining systems and, more particularly, to a multi-media presentation system driven by a position determining system.

BACKGROUND ART

Position determining systems typically provide geographic position information such as latitude, longitude, and altitude. Unfortunately, for many non-navigational applications, this geographic information is not, by itself, of interest to a user. For example, a passenger in an automobile would probably have little use for knowledge of his or her current latitude, longitude, and altitude. Rather than being provided with geographic position information in terms of latitude, longitude, and altitude, a user often may prefer that additional information be made available.

In an attempt to deliver geographic position information in a more "user-friendly" manner, some position determining systems include in-vehicle navigation systems. The in-vehicle navigation system converts the geographic position information of the vehicle to a more familiar format such as, for example, a street address or a distance to a desired destination.

Although the use of an in-vehicle navigation system provides an added degree of "user-friendliness", many users still find such geographic position information to be of little interest.

Consequently, the need has arisen for a system which uses geographic position information to provide a variety of non-navigational functions which are useful and interesting to ordinary consumers.

DISCLOSURE OF THE INVENTION

It is, therefore, an object of the present invention to provide a system which uses geographic position information to provide a variety of non-navigational functions which are useful and interesting to ordinary consumers. The above object has been achieved by a system which presents position-related multi-media information to a user.

In one embodiment of the present invention, a position determining system is located within a vehicle. A signal receiver of the position determining system receives position signals indicative of the position of the vehicle. A signal processor generates position information from the signals received by the signal receiver. The position information is then transferred to a multi-media system. The multi-media system presents audio and video information to an occupant of the vehicle.

In the present embodiment, the audio and video information presented to the vehicle occupant is directly related to the vehicle's geographic position. For example, as the vehicle nears a feature or landmark, the multi-media system automatically displays audio and/or video regarding the feature or landmark.

In another embodiment of the present invention, the present invention is employed on an aircraft. As the aircraft flies over certain features or landmarks the multi-media system presents audio and video information related to the feature beneath the aircraft. For example, as the aircraft flies over the Grand Canyon a multi-media presentation related to the Grand Canyon is presented to the aircraft occupant.

Thus, the present invention is able to use geographic position information to provide a variety of non-navigational functions which are useful and interesting to ordinary consumers.

BRIEF DESCRIPTION OF THE DRAWINGS

The accompanying drawings which are incorporated in and form a part of this specification, illustrate embodiments of the invention and, together with the description, serve to explain the principles of the invention.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Figure 1:
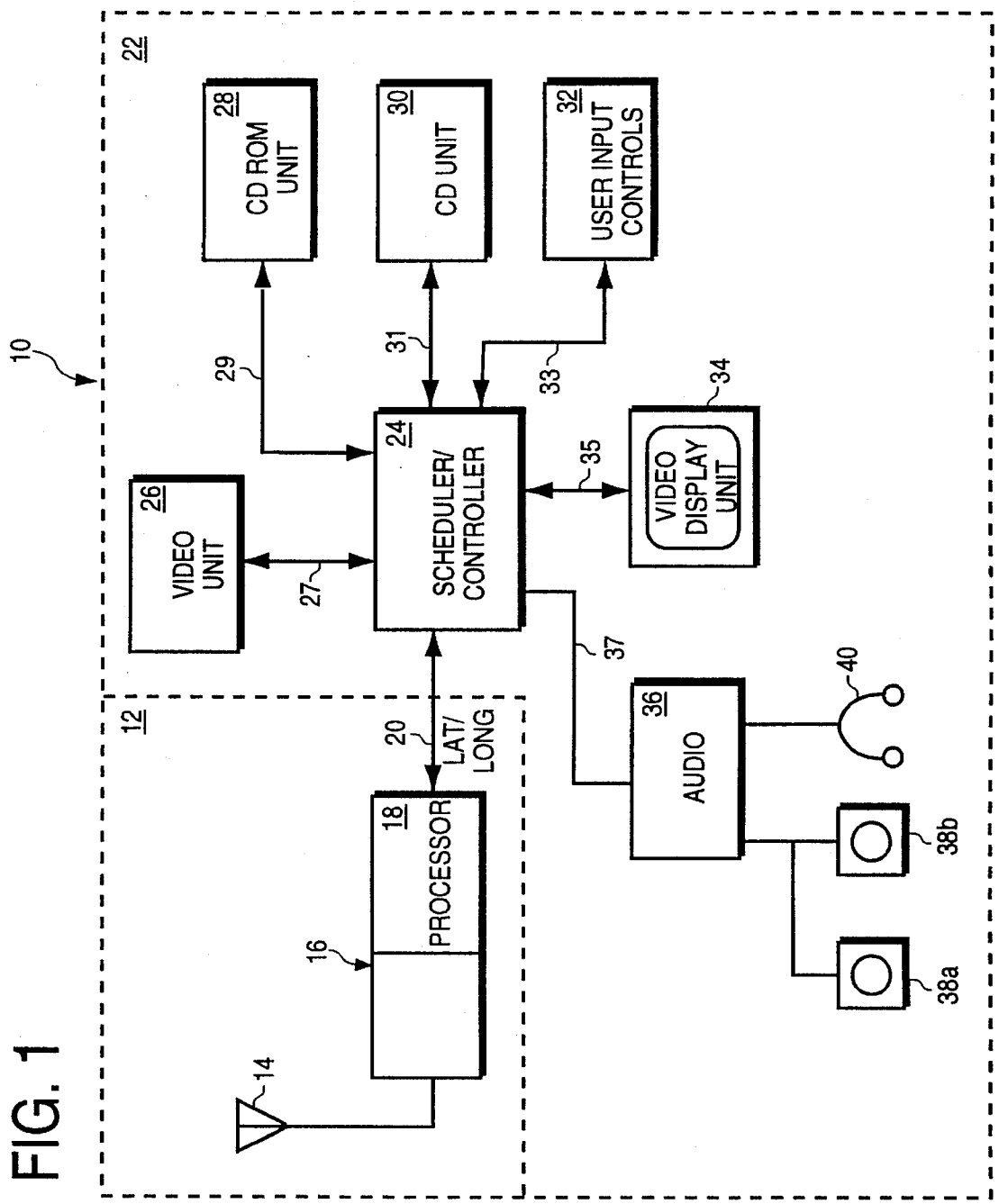
FIG. 1 is a system block diagram of a position-related multi-media system in accordance with the present invention.

With reference now to FIG. 1, a block diagram illustrating the position-related multi-media system of the present invention is shown. The following description of the present invention will begin with a detailed description of the structure of the position-related multi-media system. This description will then be followed by a detailed description setting forth the operation of the present invention. As shown in FIG. 1, the present invention includes a position determining system 12 for determining the position of a vehicle. In the present embodiment, the vehicle is a ground-traveling vehicle such as an automobile, a commercial bus, and the like. Although the position of a ground-traveling vehicle is determined in the present embodiment, the present invention is also well suited for use with aircraft, seacraft, or other vehicles which are not ground-traveling.

Referring still to FIG. 1, position determining system 12 includes an antenna 14, a receiver 16, a processor 18, and a communication line 20. In the present invention, position determining system 12 is, for example, a satellite-based radio navigation system. Satellite-based radio navigation systems such as the Global Positioning System (GPS), or the Global Orbiting Navigational System (GLONASS) are well suited for use with the present invention. Although such systems are specifically mentioned in the present embodiment, the present invention is also well suited to land-based radio navigation systems such as, for example, LORAN, Shoran, Decca, and TACAN.

Referring still to FIG. 1, system 10 of the present invention also includes a multi-media system 22. Multi-media system 22 includes a scheduler/controller 24 to which various multi-media components are connected. In the present embodiment scheduler/controller 24 is, for example, a microprocessor. A Video unit 26, a CD ROM unit 28, and an audio CD unit 30 are connected to scheduler/controller 24 via lines 27, 29, and 31, respectively. Likewise, in the present embodiment, user input controls 32, a video display unit 34, and an audio component 36, are connected to scheduler/controller 24 via lines 33, 35, and 37, respectively. Audio component 36 has speakers 38a and 38b and headphones 40 coupled thereto.

Figure 2:
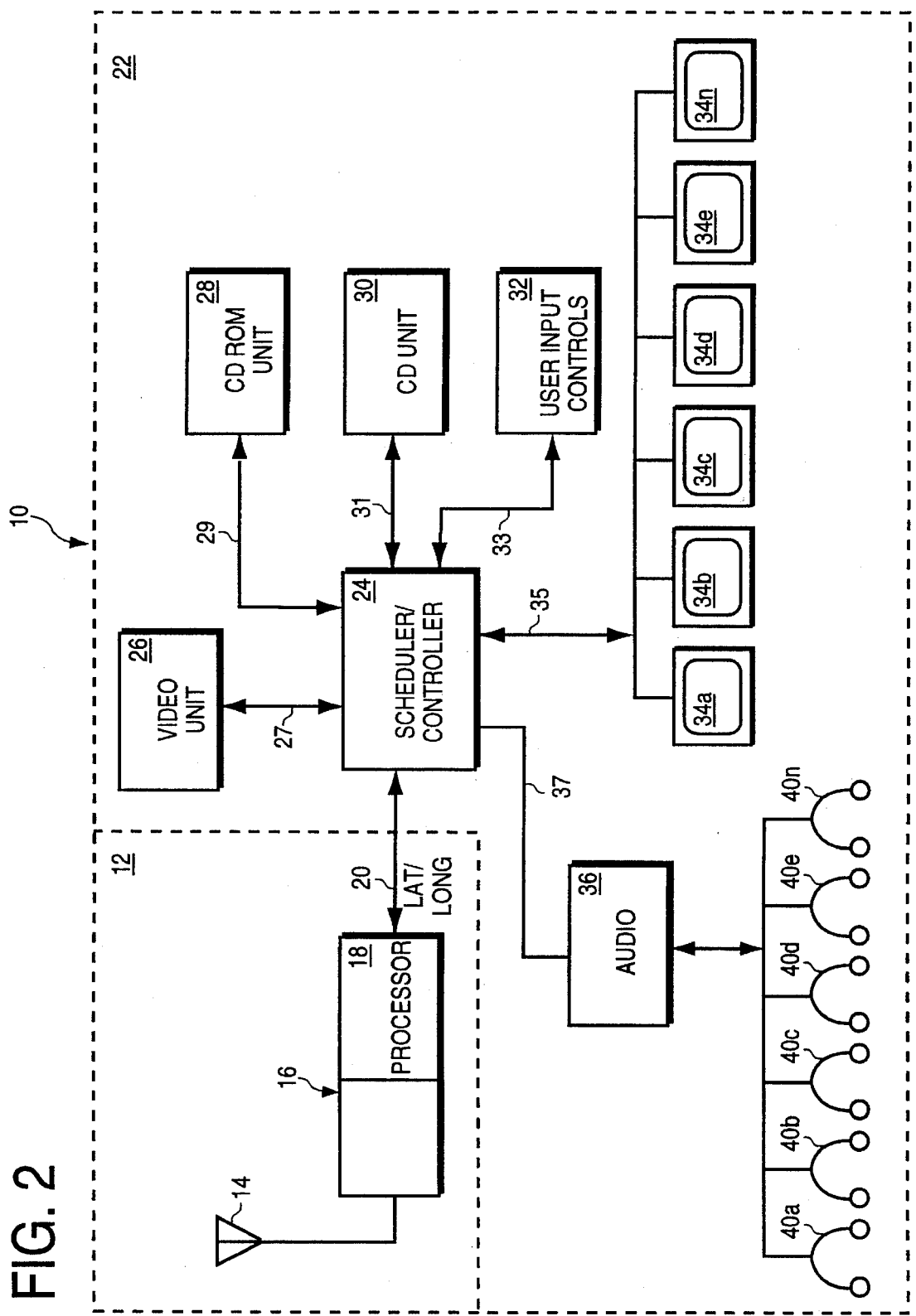
FIG. 2 is a schematic diagram of another embodiment of the present invention including multiple video display units and multiple audio output units in accordance with the present invention.

Referring now to FIG. 2, a schematic diagram of another embodiment of the present invention including multiple video display units and multiple audio output units is shown. Although only one video display unit 34 is shown in the embodiment of FIG. 1, the present invention is well suited to having multiple video display units 34a–34n connected to scheduler/controller 24 as shown in FIG. 2. The number of video display units connected to scheduler/controller 24 can be varied as desired to accommodate multiple users simultaneously. Likewise, as shown in FIG. 2, the present invention is also well suited to having multiple audio output units such as, for example, headphones 40a–40n to accommodate a plurality of users simultaneously. As with the video display units, the number of audio output units can be varied as desired. Although multiple headphones 40a–40n are depicted in the present embodiment, the present invention is also well suited to the use of multiple stereo speakers and the like.

Figure 3:
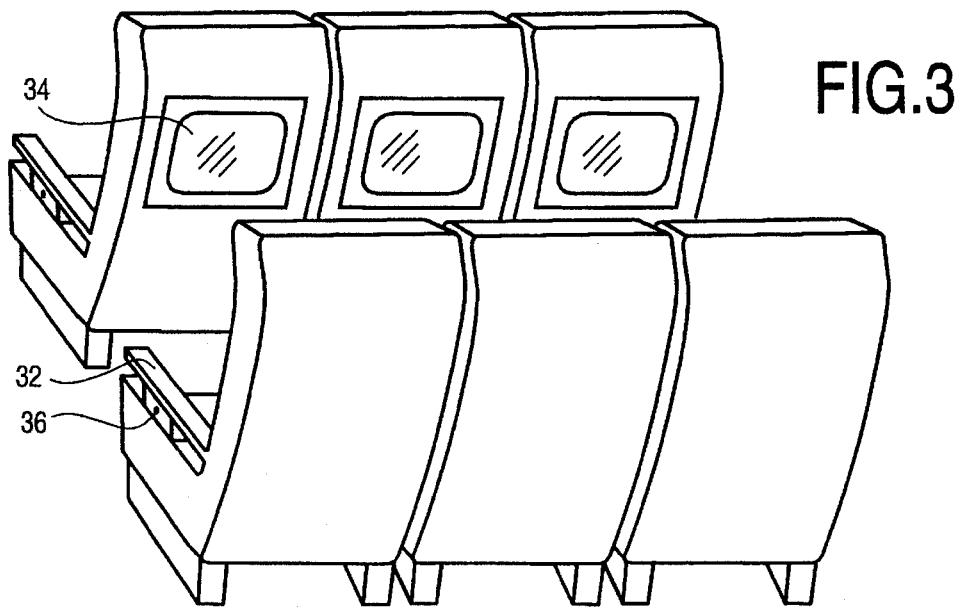
FIG. 3 is a perspective view of the interior of a vehicle having seatback video display units in accordance with the present invention.

With reference now to FIG. 3, a perspective view of the interior of a vehicle having seatback video display units is shown. In the present embodiment, the vehicle is a commercial aircraft, however, the present invention is well suited to use in numerous other types of vehicles. As shown in FIG. 3, each seat has a video display unit 34 disposed in the back side thereof. Thus, each passenger has a video display unit 34 directly in front of them. Furthermore, in the present embodiment, each seat has an audio output connection such as a headphone jack built directly into the armrest. Likewise, in the present embodiment, user input controls are also provided at the armrest of each seat. Hence, each passenger on the commercial aircraft has access to a video display unit 34, an audio output source 36, and to user input controls 32. Although video display units 34 are disposed in the seatbacks in the present embodiment, the present invention is also well suited to placing the video display units in different locations. Likewise, the present invention is also well suited to having the audio output sources 36 and user input controls 32 placed in a location other than in the armrests.

IN OPERATION

The following is a detailed description of the operation of the present invention. Referring to FIG. 1, as a vehicle moves along its path antenna 14 of position determining system 12 receives position signals. The position signals are transferred to processor 18 of receiver 16. Processor 18 processes the position signals to generate the geographic position information of the vehicle. Typically, processor 18 generates the latitude, longitude, and altitude of the vehicle. Time information signals can also be provided from position determining system 12.

The geographic position information is transferred over line 20 to scheduler/controller 24. The scheduler/controller 24 provides cueing control signals for activating and controlling various multi-media components which provide pre-recorded position-related multi-media information for presentation to a vehicle occupant. That is, scheduler/controller 24 accesses position-related multi-media information stored in, for example, Video unit 26, CD ROM unit 28, and CD unit 30. In the present embodiment, Video unit 26 is a unit which allows for random access by multiple simultaneous users to pre-recorded video data. That is, Video unit 26 is, for example, a laser disc or a digital video disk. By using, for example, a laser disc or a digital video disk, multiple users can simultaneously view different pre-recorded video images. Scheduler/controller 24 then selects the multi-media information which is relevant to the geographic position information of the vehicle. In the present embodiment, scheduler/controller 24 provides multi-media presentation options to occupants of the vehicle. Typically, the multi-media options are displayed on the video display units. The options include, for example, a listing or "menu" of available presentations on features or sites related to the geographic position of the vehicle. For example, as a vehicle passes nearby a National Park, using the user input controls 32, a vehicle occupant may be able to select a pre-recorded pictorial tour of the National Park stored on Video unit 26. The vehicle occupant can choose to have the pictorial tour include narrative commentary stored on CD unit 30. As another example, the occupant may select to have the pictorial tour accompanied by park sounds such as rushing streams, animal sounds, rain storms and the like stored on CD ROM unit 28. In the present embodiment, CD unit 30 is a unit which allows for random access by multiple simultaneous users to audio data. By using, for example, a CD unit, multiple users can simultaneously listen to different audio information.

In order to present pre-recorded position-related multi-media information, it is first necessary to record the information and index the information by its position. If the information has already been recorded, it may only be necessary to index the information with a corresponding address. Thus, each item of pre-recorded multi-media information has a corresponding position or address at which it was recorded. The address of the pre-recorded information is compared with the position information for the vehicle in which the occupant is traveling to determine which pieces of pre-recorded information are relevant at any given time.

In the present embodiment, after the selected multi-media presentation has ended, the vehicle occupant is presented with choices for a new multi-media presentation related to the new position of the vehicle. Also in the present embodiment, the user is also provided with updates informing the occupant when the vehicle approaches other features or sites on which pre-recorded multi-media information is available. Thus, in the present embodiment, the vehicle occupant can customize the multi-media presentation as desired. Additionally, the user is able to abandon a multi-media presentation on one feature or site in favor of a multi-media presentation on a different feature or site.

Figure 4:
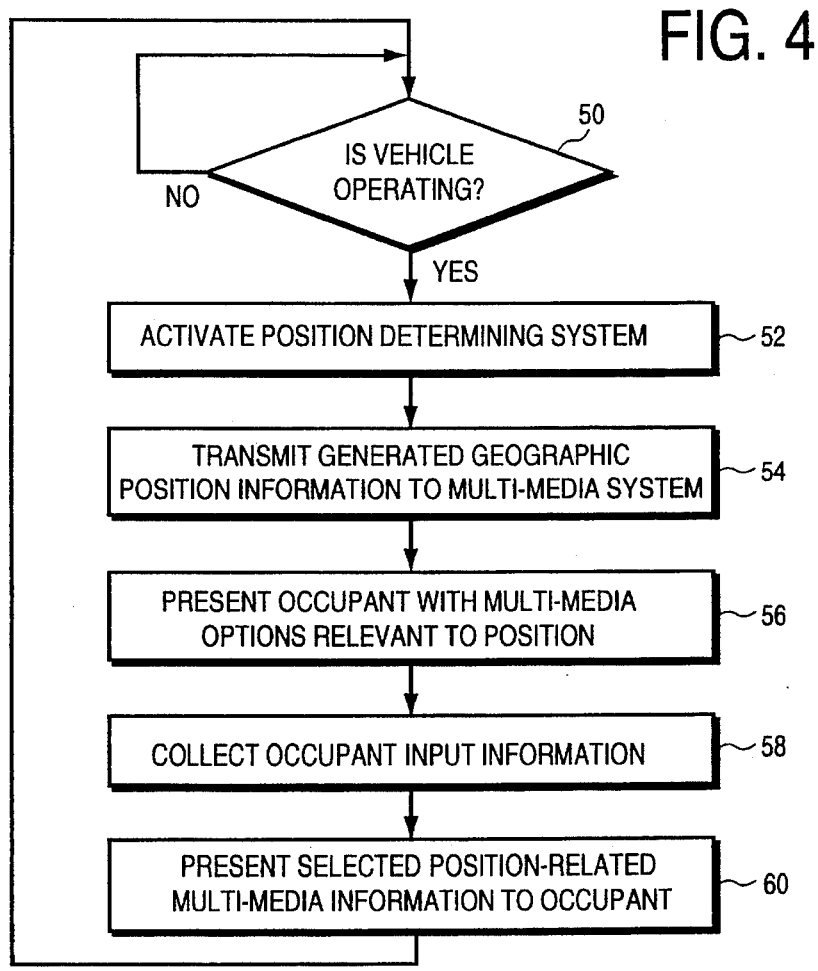
FIG. 4 is a flow diagram illustrating processing steps in accordance with the present invention.

With reference next to FIG. 4, a flow diagram illustrating steps used in one embodiment of the present invention is shown. As shown in step 50, the present invention determines whether or not the vehicle is operating. Once the vehicle begins operating, as shown in step 52, the position determining system 12 of FIGS. 1 and 2 is activated. In step 54 the generated geographic position information is transferred to multi-media system 22 of FIGS. 1 and 2. Next, as shown in step 56 the vehicle occupant is presented with multi-media options related to the vehicle's geographic position. Step 58 shows that the occupant selection is received at scheduler/controller 24 of FIGS. 1 and 2. Finally, at step 60 the occupant's selected pre-recorded position-related multi-media information is presented to the occupant.

The present invention is also well suited to use in aircraft such as, for example, commercial aircraft. As shown in FIG. 3, video display units 34 are well suited to being placed in seatbacks. Thus, each passenger on a commercial aircraft has access to a video display unit of their own. Likewise, by having the audio output sources 36 and user input controls 32 located in the armrests, the present invention is ideally suited for use by commercial aircraft passengers. Furthermore, unless seated at a window, many airline passengers have little or no view out of the aircraft. The present invention provides views to airline passengers regardless of where the passengers are seated. Additionally, unlike live video transmissions, the present invention is able to provide a pre-recorded view which is always clear and pleasant.

With reference next to FIGS. 5A–5F, examples of typical position-related views available to aircraft occupants are shown. In the present embodiment, scheduler/controller 24 of FIGS. 1 and 2 provides multi-media presentation options to passengers on the aircraft. In this embodiment, the multi-media options are displayed on the video display units. The options include, for example, a listing or "menu" of available position-related views from the aircraft. For example, as the aircraft passes over the Rocky Mountains, using the user input controls 32, passenger selects desired views of the Rocky Mountains. Likewise, the aircraft passenger can choose to have narrative commentary stored on CD unit 30 accompany the selected view. As another example, the aircraft passenger may select to have the views of the Rocky Mountains accompanied by music, or natural sounds and the like stored on CD ROM unit 28.

Figure 5A:
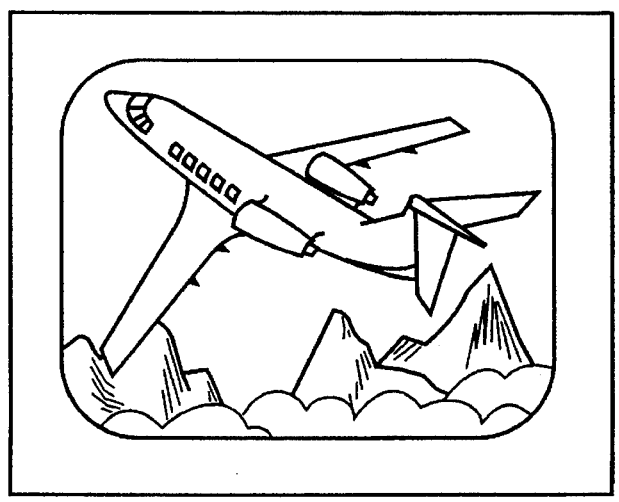
FIGS. 5A–5F are examples of typical position-related views available to aircraft occupants in accordance with the present invention.

Referring now to FIG. 5A a "wing-man's" view of the aircraft in which the occupant is flying is shown. By selecting such a view, the airline passenger would see a digital image of the aircraft in which the passenger is flying and would also see the position-related scenery below. In the present embodiment, the passenger might select to have the wing-man's view of FIG. 5A accompanied by audio information both on the features of the aircraft as well as the scenery over which the aircraft is currently flying.

Figure 5B:
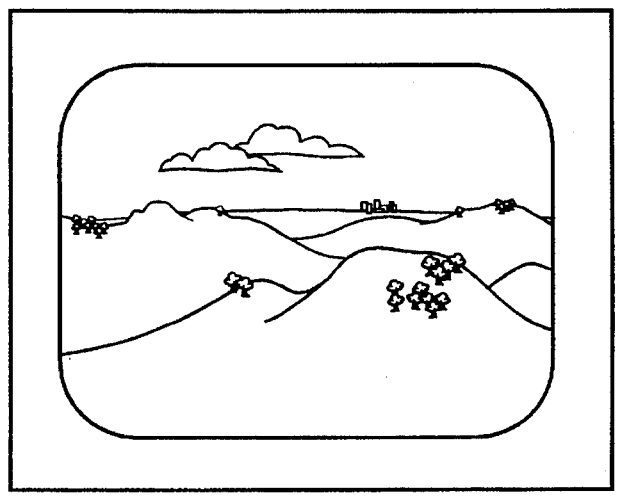

With reference next to FIG. 5B, the aircraft passenger might also select to have the "pilot's" view displayed on video display unit 34 of FIGS. 1 and 2. Therefore, in such an embodiment, as the aircraft travels along its path the passenger is able to see the views similar to the actual views seen by the pilot.

Figure 5C:
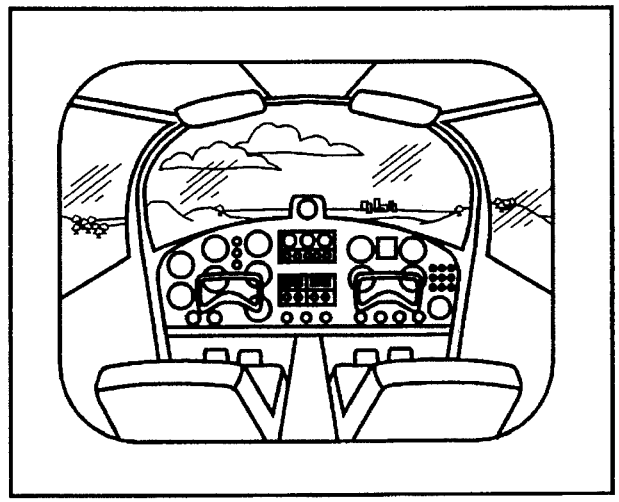

Referring now to FIG. 5C, the aircraft passenger may also select to have the "over the pilot's shoulder" view displayed on video display unit 34 of FIGS. 1 and 2. Therefore, in such an embodiment, as the aircraft travels along its path the passenger is able to see digital simulations of instrument panels and flight controls with typical values in addition to the outside views. In the present embodiment, the passenger might select to have the over the pilot's shoulder view of FIG. 5C accompanied by audio information both on the aircraft instrumentation and piloting as well as the scenery over which the aircraft is currently flying.

Figure 5D:
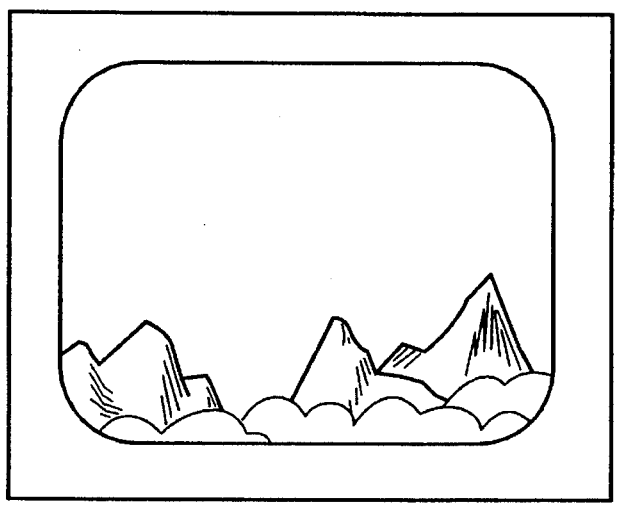

With reference now to FIG. 5D, a passenger may also choose a view showing a "window" view from the aircraft. Position-related views are shown to the passenger based upon the current position of the aircraft. That is, as the aircraft passes over, for example the Great Salt Lake, the lake would be visible to passengers with window seats. However, the present invention would provide a pre-recorded multi-media presentation of the Great Salt Lake to passengers as the aircraft passes over the lake. Hence, the present invention provides a "window seat" to every passenger on the aircraft. Once again, the passenger is also able to select various audio programs to accompany the video presentation.

Figure 5E:
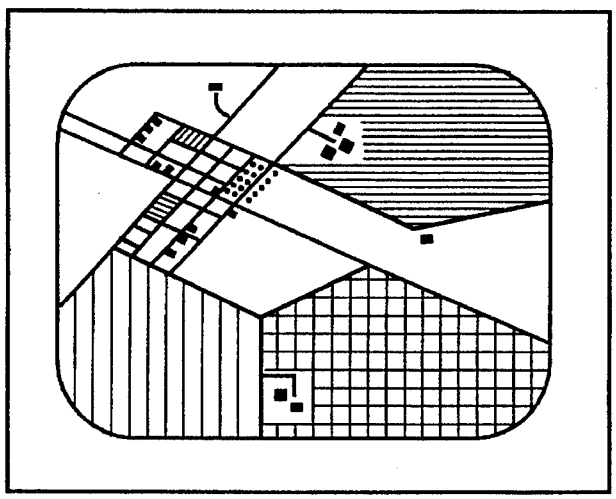

Referring next to FIG. 5E, the present invention is also well suited to providing views which are unusual or different from those views available to an airline passenger. As an example of a different view, FIG. 5E represents a "glass-bottom plane" view. As the aircraft flies along its path, topographical views of the features directly beneath the aircraft's current position are shown to the passenger. That is, the present invention determines the aircraft's geographic position and presents pre-recorded multi-media information showing what is currently beneath the aircraft. As with previous embodiments, the passenger is also able to select various audio programs to accompany the video presentation.

Additionally, because the views of the features are pre-recorded, the present invention is able to provide daytime views of features over which the aircraft is flying even when it is dark. Likewise, the present invention is also able to provide nighttime views of features over which the aircraft is flying even when it is light.

Figure 5F:
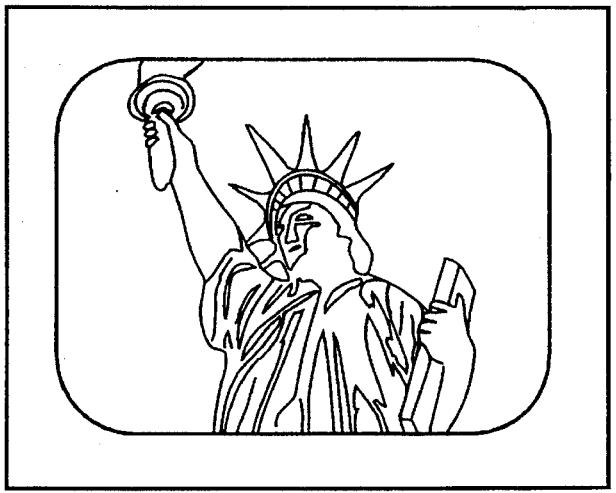

With reference next to FIG. 5F, in addition to providing views from different locations within the aircraft, the present invention is also well suited to providing multi-media presentations on features or sites in close proximity to the path over which the aircraft is flying. In this embodiment, the multi-media options are displayed on the video display units. For example, as the aircraft passes over or near the Statue of Liberty, using the user input controls, the passenger selects a desired pictorial presentation on the Statue of Liberty. Likewise, the aircraft passenger can choose to have narrative commentary stored on the CD unit accompany the pictorial presentation. As another example, the aircraft passenger may select to have the pictorial presentation of the Statue of Liberty accompanied by music, narration, and the like.

Thus, the present invention is able to use geographic position information to provide a position-related multi-media presentation which is useful and interesting to a vehicle occupant.

The foregoing descriptions of specific embodiments of the present invention have been presented for the purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

I claim:

1. A position-related multi-media presentation apparatus for a vehicle comprising:

a position determining system attached to a vehicle to be monitored, said position determining system further including;

a signal receiver, a signal processor coupled to said signal receiver for generating position information from signals received by said signal receiver, and a multi-media system coupled to said position determining system, said multi-media system further including;

a presentation scheduler/controller for activating the presentation of audio and video information when said vehicle is at a specific location, at least one video display unit coupled to said presentation scheduler/controller, and at least one audio output unit coupled to said presentation scheduler/controller;

wherein said vehicle is an aircraft and wherein said video information displayed on said video display means includes simulated views from over the shoulder of the pilot of said aircraft.

2. The position-related multi-media presentation apparatus of claim 1 further including user input controls coupled to said multi-media system.

3. The position-related multi-media presentation apparatus of claim 1 further including a CD ROM unit coupled to said multi-media system.

4. The position-related multi-media presentation apparatus of claim 1 further including a Video unit coupled to said multi-media system.

5. The position-related multi-media presentation apparatus of claim 1 further including a CD unit coupled to said multi-media system.

6. The position-related multi-media presentation apparatus of claim 1 wherein said position determining system is selected from the class of satellite-based radio navigation systems consisting of the Global Positioning System and the Global Orbiting Navigation System.

7. The position-related multi-media presentation apparatus of claim 1 wherein said position determining system is selected from the class of ground-based radio navigation systems consisting of LORAN, Shoran, Decca, and TACAN.

8. The position-related multi-media presentation apparatus of claim 1 wherein said at least one video display unit is disposed on a respective seat back of said aircraft.

9. The position-related multi-media presentation apparatus of claim 1 wherein said at least one audio output unit is a stereo speaker.

10. The position-related multi-media presentation apparatus of claim 1 wherein said at least one audio output unit is a speaker headphone unit.

11. A position-related multi-media presentation system for a vehicle comprising:

position determining means for generating position information, said position determining means coupled to a vehicle and further including;

signal receiver means for receiving signals indicative of the position of said vehicle signal processor means coupled to said signal receiver for generating position information from said signals received by said signal receiver means, and multi-media means coupled to said position determining means for presenting audio and video information to user, said multi-media means further including;

presentation scheduler/controller means for activating the presentation of audio and video information when said vehicle is at a specific location, video display means coupled to said presentation scheduler/controller means for displaying said video information, and audio output means coupled to said presentation scheduler/controller for playing said audio information, wherein said vehicle is an aircraft and wherein said video information displayed on said video display means includes simulated views from over a shoulder of a pilot of said aircraft.

12. The position-related multi-media presentation system of claim 11 wherein said scheduler/controller means activates the presentation of audio and video information specifically related to the position of said vehicle as determined by said position determining means.

13. The position-related multi-media presentation system of claim 11 further including user input control means coupled to said multi-media means for controlling said audio and video information.

14. The position-related multi-media presentation system of claim 11 further including CD ROM means coupled to said multi-media means for providing audio and video input to said multi-media means.

15. The position-related multi-media presentation system of claim 11 further including Video means coupled to said multi-media means for providing audio and video input to said multi-media means.

16. The position-related multi-media presentation system of claim 11 further including CD means coupled to said multi-media means for providing audio input to said multi-media means.

17. The position-related multi-media presentation system of claim 11 wherein said position determining means is selected from the class of satellite-based radio navigation systems consisting of the Global Positioning System and the Global Orbiting Navigation System.

18. The position-related multi-media presentation system of claim 11 wherein said position determining means is selected from the class of ground-based radio navigation systems consisting of LORAN, Shoran, Decca, and TACAN.

19. The position-related multi-media presentation system of claim 11 wherein said video display means is disposed on a seat back of said aircraft.

20. The position-related multi-media presentation system of claim 11 wherein said audio output means is a stereo speaker.

21. The position-related multi-media presentation system of claim 11 wherein said audio output means is a stereo speaker headphone unit.

22. The position-related multi-media presentation system of claim 11 including means for user selection of presentation information.

23. The position-related multi-media presentation system of claim 11 wherein said video information displayed on said video display means includes simulated views from the cockpit of said aircraft.

24. The position-related multi-media presentation system of claim 11 wherein said video information displayed on said video display means includes simulated views of said aircraft and background scenery as seen from a wing-man traveling in close proximity to said aircraft.

25. The position-related multi-media presentation system of claim 11 wherein said video information displayed on said video display means includes simulated views from a window seat of said aircraft.

26. The position-related multi-media presentation system of claim 11 wherein said video information displayed on said video display means includes simulated views of the earth as seen from beneath said aircraft.

27. The position-related multi-media presentation system of claim 11 wherein said video information displayed on said video display means includes simulated daytime views from said aircraft.

28. The position-related multi-media presentation system of claim 11 wherein said audio and video information presented by said Multi-media means includes audio and video information on features in close proximity to a path over which said aircraft is flying.

29. The position-related multi-media presentation system of claim 11 wherein said user control means further include means for selecting the views to be displayed on said video display means.

30. The position-related multi-media presentation system of claim 11 wherein said user control means further include means for freezing a view being displayed on said video display means.

31. The position-related multi-media presentation system of claim 11 wherein said audio and video information presented by said multi-media means includes audio and video information on features which are in close proximity to a path other than path over which said aircraft is flying.

32. A method of presenting position-related multi-media information comprising the steps of:

receiving position signals at a signal receiver of a position determining system coupled to a vehicle, processing said position signals using said position determining system to generate position information of said vehicle, transferring said position information from an output of said position determining system to an input of a multi-media system, presenting to at least one occupant of said vehicle multi-media information related to said generated position information of said vehicle;

wherein said step of presenting to at least one occupant of said vehicle multi-media information related to said generated position information of said vehicle further includes presenting said multi-media information to at least one occupant of an aircraft;

wherein said step of presenting said multi-media information to at least one occupant of an aircraft further includes presenting video information simulating views from over a shoulder of a pilot of said aircraft.

33. The method as recited in claim 32 wherein said step of presenting to at least one occupant of said vehicle multi-media information related to said generated position information of said vehicle further includes presenting video information related to said generated position information to said at least one occupant of said vehicle on a display unit disposed within said vehicle.

34. The method as recited in claim 32 wherein said step of presenting to at least one occupant of said vehicle multi-media information related to said generated position information of said vehicle further includes presenting audio information related to said generated position information to said at least one occupant of said vehicle.

35. The method as recited in claim 32 wherein said step of presenting said multi-media information to at least one occupant of an aircraft further includes presenting video information related to said generated position information to said at least one occupant of said aircraft on a display unit disposed within a seat back of said aircraft.

36. The method as recited in claim 32 wherein said step of presenting said multi-media information to at least one occupant of an aircraft further includes presenting video information simulating views from the cockpit of said aircraft.

37. The method as recited in claim 32 wherein said step of presenting said multi-media information to at least one occupant of an aircraft further includes presenting video information simulating views of said aircraft and of background scenery as seen from a wing-man traveling in close proximity to said aircraft.

38. The method as recited in claim 32 wherein said step of presenting said multi-media information to at least one occupant of an aircraft further includes presenting video information simulating views from a window seat of said aircraft.

39. The method as recited in claim 32 wherein said step of presenting said multi-media information to at least one occupant of an aircraft further includes presenting video information simulating views of the earth as seen from beneath said aircraft.

40. The method as recited in claim 32 wherein said step of presenting said multi-media information to at least one occupant of an aircraft further includes presenting video information simulating daytime views from said aircraft.

41. The method as recited in claim 32 wherein said step of presenting said multi-media information to at least one occupant of an aircraft further includes presenting video information simulating views of features in close proximity to a path over which said aircraft is flying.

42. The method as recited in claim 41 further including the step of presenting audio information related to features in close proximity to a path over which said aircraft is flying.

43. The method as recited in claim 32 wherein said step of presenting said multi-media information to at least one occupant of an aircraft further includes presenting video information simulating views of features which are in close proximity to a path other than path over which said aircraft is flying.

44. The method as recited in claim 32 wherein said step of presenting said multi-media information to at least one occupant of said vehicle further includes the step of selecting the multi-media information to be presented to said at least one occupant using user input controls.

* * * * *